April 25, 1961     G. BRANDANO     2,981,228
DISPLAY TANK FOR SHELLFISH
Filed April 13, 1959
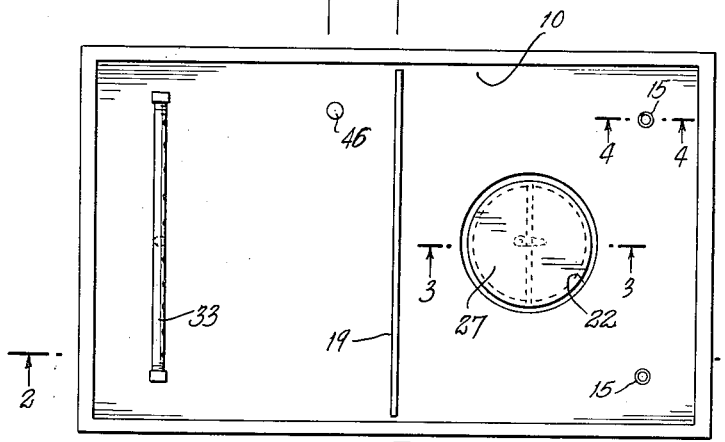
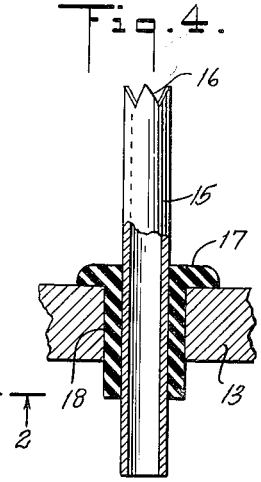
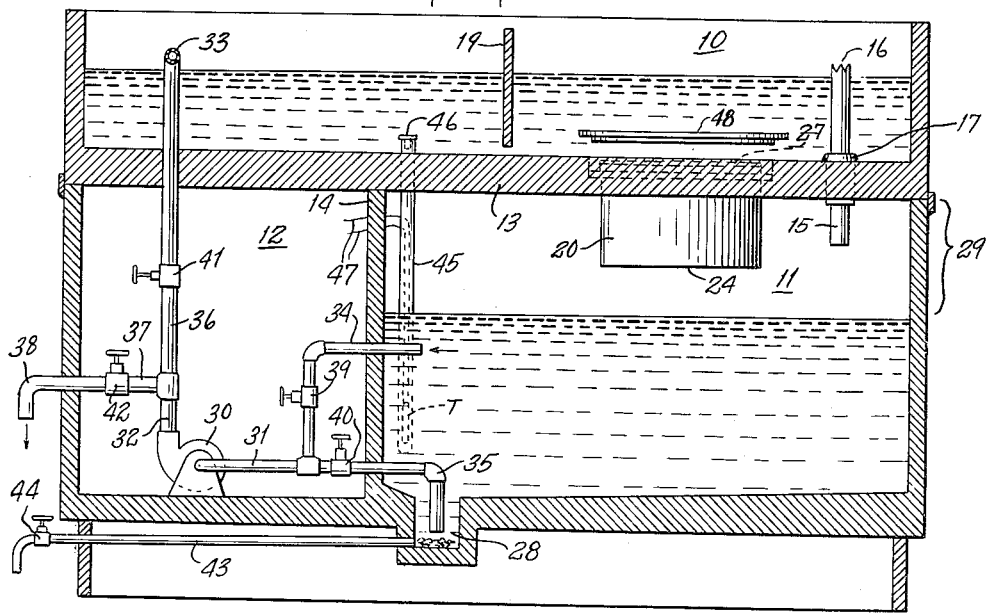
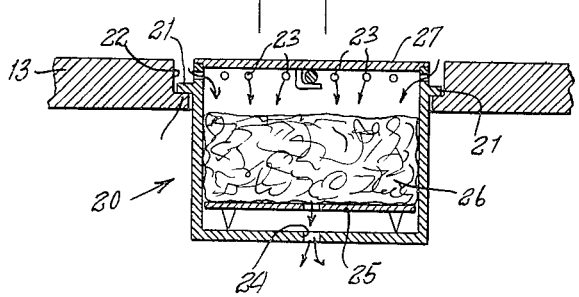
INVENTOR.
GIUSEPPE BRANDANO
BY Krazinski & Nolan
ATTORNEYS

United States Patent Office 2,981,228
Patented Apr. 25, 1961

2,981,228

DISPLAY TANK FOR SHELLFISH

Giuseppe Brandano, 1403 River St., Haverhill, Mass.

Filed Apr. 13, 1959, Ser. No. 806,148

6 Claims. (Cl. 119—2)

The present invention relates to aquariums and, more particularly, to an improved tank for displaying and maintaining shellfish, such as lobsters, in a healthy condition.

It has been established that lobsters can be maintained in a healthy condition and fit for human consumption for a considerable time after they have been removed from their natural habitat provided they are kept in a saline solution having a desired temperature, salinity and oxygen content.

Heretofore, display tanks for lobsters have been proposed which apparently fulfilled these requirements but actually did not. One of the misconceptions has been to supply the tank with highly aerated water, whereby an unnatural condition was created in the tank to which lobsters are not accustomed and cannot endure. Another shortcoming has been that no provision has been made to maintain the lobsters in healthy condition for a tolerable length of time should the circulatory system fail. Such systems have failed to take into account that stagnant water for a few hours is fatal to lobsters, whereas lobsters remain healthy in fresh air for as long as thirty-six hours or more.

The delicacy of lobster flesh is well known; however, if the lobster is not carefully maintained alive and healthy, the flesh loses its flavor. Thus, the care and preservation of lobsters are of great importance.

Accordingly, an object of the present invention is to provide a tank which overcomes the shortcomings of previously proposed systems.

Another object is to provide a tank wherein the water supplied thereto is aerated naturally.

Another object is to provide a tank which empties by itself in the event of failure of the circulatory system.

Another object is to provide an air supply pipe which is adjustable and also serves to predetermine the maximum water level in the tank.

A further object is to provide such a tank in a simple, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Fig. 1 is a plan view of a tank in accordance with the present invention.

Fig. 2 is an enlarged, sectional view of the tank taken along the line 2—2 on Fig. 1.

Fig. 3 is an enlarged sectional view taken along the line 3—3 on Fig. 1.

Fig. 4 is an enlarged sectional view of the standpipe taken along the line 4—4 on Fig. 1.

Referring now to the drawing in detail, there is shown a tank which generally comprises an upper compartment 10 for displaying the shellfish, lower compartments 11 and 12 beneath the upper compartment and separated therefrom by a horizontal wall 13 which is the bottom of the upper compartment. A circulatory system for withdrawing water from the lower compartment 11 and delivering it to the upper compartment 10 is located in lower compartment 12 which is separated from its adjacent lower compartment 11 by a vertical wall 14. Conventional refrigerating equipment and refrigerating coils are not shown in order to simplify the drawing, the former equipment being located in compartment 12 and the latter coils in the bottom of compartment 11.

The upper compartment 10 is shallow, whereas the lower compartment 11 is much deeper and the capacities of these compartments 10 and 11 are such that the lower compartment 11 can contain all the water normally contained in the upper compartment 10 plus the water normally contained in the lower compartment 11 for the purpose described hereinafter. Since the lower compartment is initially provided with sufficient water for both upper and lower compartments, as will appear hereinafter under operation of the invention, the capacity of water in each compartment during operation will obviously vary in accordance with the quantity of lobsters present in the upper compartment. Thus, as seen in Fig. 2, the normal capacity of water in each compartment is not greater than a slight access of one-half the total volumetric capacity of each compartment.

The upper compartment 10 is provided with a standpipe 15 which normally extends above the water level therein and through the bottom of the upper compartment, that is the wall 13, to supply fresh air to the lower compartment 11, which air is absorbed by the water therein. This pipe 15 also serves as an overflow pipe for the upper compartment and has serrations 16 at its upper end which serve as weirs for enabling the water to enter the pipe 15 before the water level exceeds the uppermost portion of the pipe. Since the volume of water and shellfish stored therein may vary from time to time, the standpipe 15 is mounted for vertical adjustment in an apertured plug 17 fitted in a hole 18 in the wall 13 (Fig. 4). As shown in Fig. 1, two of such standpipes 15 may be provided or more, if required.

If desired, a conventional divider 19 may be placed in the upper compartment to segregate fighting lobsters or to separate the lobsters according to size.

The water in the upper compartment normally is drained into the lower compartment 11 by suitable openings in the wall 13, which openings are dimensioned to drain the water at about the same rate as the water is supplied to the upper compartment 10. Such drainage means, as shown in Fig. 3, comprises a box 20 having a flange 21 seated in a recess 22 in the wall 13, apertures 23 spaced around the periphery of the box intermediate the top of the box and the flange 21, and having a flow control opening 24 in the bottom thereof, a perforated partition 25 spaced from the bottom of the box, filter material 26 supported on the partitions 25, and an imperforate cover 27 for the box. The diameter of the cover 27 is smaller than that of the recess 22 in order to permit the water to pass in the space therebetween and thence through the apertures 23 into the filter material 26, where the water is filtered, after which the water falls by gravity through the air space into the lower compartment 11. This arrangement provides ready access to the filter when it is desired to replace or clean the filter material.

The lower compartment 11 has at its lower left end (see Fig. 2) a sump 28 for collecting material which passes through the filter. It is to be noted that between the wall 13 and the surface of the brine there is an air space 29 which is an essential feature of applicant's invention in that this air space supplies the falling brine from the filter with the required aeration. Since the falling brine will absorb only the required amount of air, supplied through pipe 15, there is no danger of incorporating too much air in the brine as heretofore.

The circulatory system, which is shown in lower compartment 12, comprises a motor driven water pump 30 having an intake pipe 31, an output pipe 32, and a spray pipe 33 above the water level of the upper compartment. The intake pipe 31 has a branch 34 provided with an inlet below the water level of the lower compartment and has a second branch 35 provided with an inlet in the sump 28. The output pipe has a branch 36 connected to the spray pipe 33 and has a second branch 37 connected to a drainage pipe 38. The branches 34, 35, 36 and 37 are respectively provided with valves 39, 40, 41 and 42 for the purpose about to be described. To facilitate removal of substantially all sediment from the sump 28 and thereby prevent fermentation thereof, a lateral pipe 43 extends from the bottom of the sump 28 exteriorly of the tank, as seen in Fig. 2, and is provided with a valve 44. To remove the sediment it is merely necessary to open the valve 44 and flush the sump with water.

In conventional practice the thermostat for controlling the temperature of the refrigerating system has been heretofore placed in the brine water, so that after a time corrosion thereof occurs. The thermostat T in this instance is placed in a closed pipe 45 which is filled with fresh (non-saline) water and which extends from lower compartment 11 up and through wall 13 into upper compartment 10. A removable cap 46 at the top of the pipe 45 enables the fresh water to be replenished therein as required. Thermostatic leads 47 are shown extending from the pipe 45 through the wall 14 and into the lower compartment 12 for connection to refrigerating control equipment (not shown).

In operation, with both the upper and lower compartments 10 and 11, respectively, empty, fresh (non-saline) water is poured into the lower compartment 11 through the opening for the box 20 (now removed) until the fresh water is at the desired level, sufficient for both the upper and lower compartments, after which the box 20 is restored to its original position. Dry sea salt of the required amount is then placed in the upper compartment 10 and, to prevent the sea salt from flowing into the filter, the top 27 is removed and an imperforate cover 48 (Fig. 2) of larger diameter than the top 27 is placed in sealing engagement over the opening in the horizontal wall 13 for the box 20. The pump 30 is then started with the valves 39 and 41 open and the valves 40 and 42 closed, whereby the fresh water is brought from the lower compartment through the pipes 34 and 31, the pump 30, the pipes 32 and 36, and the spray pipe 33 to the upper compartment to dissolve the seat salt, assisted by manual agitation.

Since the filter passageway is closed, the water will rise until its level reaches the weir 16 of the standpipe 15, after which the saline or brine water flows down the overflow pipe 15 to the compartment 11. The brine water is circulated in this manner until the sea salt is thoroughly dissolved with no solid particles of salt remaining. The cover 48 is then replaced with the top 27 and the brine water circulation continued in its normal manner through the box 20 and filter material 26.

As the body of brine water is circulated, fresh air is drawn into the lower compartment 11 through the standpipe 15 and is sufficiently absorbed by the brine water therein to give the brine water supplied to the spray pipe 33 a desired air content which is equivalent to the air content in such clean salt water that is in the lobsters' natural habitat. This manner of aerating the water has been found to keep the lobsters in healthier condition for a greater length of time.

In the event that the pump fails, the water supply to the upper compartment stops and the water thereein drains into the lower compartment 11 by way of the filter 20 quickly enough to prevent stagnation of the water in the upper compartment. Since lobsters can survive in air for thirty-six hours or more they are not endangered because the pump failure, even if it happens during the night, will be detected much sooner and repairs can be made to put the tank in working condition again.

In the even that the filter is partially clogged by lobster droppings and the brine water drains too slowly therethrough, the water level in the upper compartment rises and enables water to return to the lower compartment by the standpipes 15. In this connection a particular feature of applicant's invention resides in the ready replacement of the filter material 26 without loss of the expensive brine water. Heretofore it has been necessary to drain the brine water from the tank before the filter material and droppings could be removed and new filter material installed. Thus, heretofore the tendency has been to delay the filter material replacement until almost the last moment with consequent impairment of the health of the lobsters and loss of flavor in the lobster meat. In applicant's invention the soiled filter material can be easily and quickly replaced by merely stopping the pump 30, draining the brine water from the upper compartment into the lower compartment through plug 17 (pipe 15 being removed) until the upper compartment is empty, removing the top 27 and soiled filter 26 in box 20, and then placing new filter material within the box and the top 27 on the box, after which the brine water circulation is resumed in the manner explained hereinbefore. It is thus seen that the foregoing can only be accomplished because of applicant's lower compartment 11 which has the capacity for holding the water content of both the upper and lower compartments with an air space therebetween.

Also, as the supply of lobsters in the upper compartment diminishes or increases the water level in the upper compartment correspondingly recedes or rises. The standpipes may then be adjusted to a lower or higher level, so that they act as overflow pipes soon after the water level rises by virtue of clogging of the filter.

When all of the lobsters have been disposed of and it is desired to empty the tank and replace the water with a fresh supply, the valves 40 and 42 are opened and the valves 39 and 41 are closed, whereby circulation through the compartments is stopped and water and matter settled in the sump 28 are pumped from the lower compartment 11 through the pipes 35 and 31, the pump 30, and the pipes 32 and 37 to the drainage pipe 38. After all the water has been pumped out, the filter material can be replaced, as hereinbefore mentioned, and the compartments can be scrubbed and flushed, if cleaning is required, to place the tank in condition for reloading with a fresh supply of water and lobsters.

Access to the lower compartments 11 and 12 can be readily had by merely removing the entire upper compartment from the tank. Also, the filter 20 can be readily removed and cleaned by emptying the brine water into the lower compartment 11, without loss of the brine water as is the present practice.

In view of the foregoing description, it will be seen that the present invention provides a simple and economical tank which keeps shellfish in healthy condition, avoids over-aeration and stagnation, and can be conveniently cleaned and reloaded.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a tank for displaying and maintaining shellfish, such as lobsters, in healthy condition, the combination of an upper compartment for containing water and displaying the shellfish, a lower compartment for containing water, a wall having an opening therein and separating said upper and lower compartments, gravitational fluid flow means in said opening for communicating between said upper and lower compartments, said lower compartment having sufficient volumetric capacity to hold the normal supply of water for both upper and lower compartments, whereby the upper compartment water may be readily emptied into the lower compartment to provide access to said fluid flow means for replacement thereof, a standpipe extending above the normal water level of said upper compartment and through said wall for supplying air to said lower compartment, and a water circulating system including a pump, a water intake for said pump in said lower compartment and a water output for said pump above the water level of said upper compartment, the volumetric capacity of said upper and lower compartments and the rate of said pump being so related to maintain an air space in said lower compartment, whereby the water in said lower compartment is at a level below said means and is therefore capable of absorbing air as the water gravitationally flows from said means to said lower compartment, which air absorbed in the water is adapted to be introduced with the water into the upper compartment to maintain the oxygen content therein at a value to enable the shellfish to be maintained in a healthy condition.

2. A tank according to claim 1, wherein said means is a removable filter disposed in said opening of said wall separating the lower and upper compartments for straining the water in said upper compartment as it drains gravitationally into said lower compartment.

3. A tank according to claim 2, wherein said filter means is constituted by a hollow receptacle disposed in said opening in said wall, an external flange on said receptacle resting on a shoulder of a recess provided adjacent said opening in said wall, said receptacle having apertures disposed around its periphery above said flange for passage of water therethrough from said upper compartment, and filtering material within said receptacle below said apertures for straining solid particles from said water.

4. A tank according to claim 1, wherein said lower compartment has a sump, said pump has a second input in said sump and a second output exteriorly of said tank, and valving for selectively opening said first mentioned input and output of said pump and closing said second input and output of said pump and vice versa to respectively circulate water or empty said sump.

5. A tank according to claim 1, wherein said standpipe is adjustable to predetermine the maximum water level in said upper compartment.

6. A tank according to claim 1, wherein the temperature of the water in said compartments is controlled by a thermostat disposed within a closed tube containing fresh water, said closed tube extending from the upper compartment to the lower compartment.

References Cited in the file of this patent

UNITED STATES PATENTS

| | | |
|---|---|---|
| 1,956,524 | Byram | Apr. 24, 1934 |
| 2,302,336 | MacDonald | Nov. 17, 1942 |
| 2,594,474 | McGrath | Apr. 29, 1952 |
| 2,672,845 | Schneithorst | Mar. 23, 1954 |